United States Patent [19]
Kafka

[11] Patent Number: 5,205,972
[45] Date of Patent: Apr. 27, 1993

[54] PROCESS FOR INCORPORATING ORGANIC FIBROUS FILLERS IN ELASTOMERS

[75] Inventor: Fred Y. Kafka, Louisville, Ky.

[73] Assignee: E. I. Du Pont de Nemours and Company, Wilmington, Del.

[21] Appl. No.: 784,732

[22] Filed: Oct. 28, 1991

Related U.S. Application Data

[63] Continuation of Ser. No. 429,675, Oct. 31, 1989, abandoned.

[51] Int. Cl.$^5$ .................. B29C 47/00; B29C 47/76
[52] U.S. Cl. ..................... 264/101; 264/141; 264/211; 264/349; 523/333; 523/335; 523/340; 523/352; 524/572; 524/575; 524/577; 528/502
[58] Field of Search ............... 264/101, 102, 141, 211, 264/211.12, 349; 523/332, 333, 334, 335, 340, 352; 524/572, 575, 577; 528/501, 502

[56] References Cited

U.S. PATENT DOCUMENTS

| | | | |
|---|---|---|---|
| 3,751,527 | 8/1973 | Bortnick | 525/197 |
| 4,136,251 | 1/1979 | Bice et al. | 528/502 X |
| 4,263,184 | 4/1981 | Leo et al. | |
| 4,332,760 | 6/1982 | Warfel | 264/211 X |
| 4,588,780 | 5/1986 | Edwards et al. | 525/184 |

FOREIGN PATENT DOCUMENTS 58-183235 10/1983 Japan.
2138430 10/1984 United Kingdom.

*Primary Examiner*—Leo B. Tentoni
*Attorney, Agent, or Firm*—Marilyn H. Bromels

[57] ABSTRACT

Incorporating fibrous filler into an elastomer by adding to a screw extruder an aqueous slurry of an organic fibrous filler having a length less than about 25 mm and an elastomer latex, e.g., polychloroprene latex. The latex and slurry are fed to the extruder and the latex is coagulated in the extruder. The coagulated latex containing fibrous filler is fed to a dewatering zone. The flow of coagulated elastomer is restricted so that water present in the coagulated elastomer is separated by means of a vent in the extruder upstream from the restriction and discharging and recovering the fiber-filled elastomer. The compound can be used for the manufacture of power transmission belts.

9 Claims, 3 Drawing Sheets

PROCESS FOR INCORPORATING ORGANIC FIBROUS FILLERS IN ELASTOMERS

This is a continuation of application Ser. No. 07/429,675 filed Oct. 31, 1989, now abandoned.

BACKGROUND OF THE INVENTION

This invention relates to a process for incorporating fibrous filler into elastomeric polymers.

Fibrous fillers have been incorporated into plastics and elastomers for the purpose of providing additional strength to articles fabricated from the polymers, obtaining good surface contact properties for articles such as power transmission belts, and reducing compound cost by serving as low cost fillers. Fibrous fillers have been added to plastics and elastomers by heating the polymers to soften them and thoroughly mixing the polymer and filler on a mill or in an internal mixer. This procedure has inherent drawbacks when fibers are incorporated in certain elastomers. The need for incorporating fibers into elastomers is critical for many uses of articles fabricated from elastomers such as, for example, power transmission belts, etc. The procedure now used on a commercial scale by the fabricator is to mix the solid uncured elastomer with the fibrous filler in a BANBURY mixer or on a rubber mill. Mixing is continued for about 5 to 10 minutes. After that time mixing must be discontinued for a substantial amount of time because the elastomer becomes overheated, which, if mixing is continued, would degrade the elastomer and result in substantial lowering of the important properties of the elastomer and/or scorching of the stock. When the mixture of the elastomer and fiber overheats, it must be cooled before mixing is continued. This procedure of mixing to incorporate the filler in the elastomer and cooling due to heat build-up may require as many as six sequences. Moreover, progressive working of the rubber can produce an unusable scorched product before an adequate mix is even possible, especially with aramid fibers in commercial scale mixers when cooling capacity is limited. The incorporation of the fibrous fillers into the elastomer by prior art methods is both energy intensive and expensive due to the long times required by the fabricator to incorporate fiber into the elastomer. The present invention provides a process for incorporating organic fibrous fillers into the elastomer which is economical, readily accomplished and minimizes the dispersive work necessary to achieve a given compound quality.

SUMMARY OF THE INVENTION

The present invention is directed to a process for incorporating fibrous filler into an elastomer which comprises:
 (a) feeding to a screw extruder an elastomer latex and an aqueous slurry containing about 1-100 parts by weight organic fibrous filler per 100 parts elastomer, said fibrous filler having a length less than about 25 mm, the slurry and latex being fed to the extruder either premixed or as separate streams and subsequently mixed in the extruder,
 (b) coagulating the elastomer latex in the screw extruder to form a coagulated elastomer containing the organic fibrous filler,
 (c) feeding the coagulated elastomer containing organic fibrous filler into a dewatering zone,
 (d) feeding the coagulated fiber-filled elastomer through a flow restriction which applies back pressure sufficient that water present in the coagulated fiber-filled elastomer is forced out of a vent provided in the extruder upstream from the flow restriction, and
 (e) discharging and recovering the organic fiber-filled elastomer.

DETAILED DESCRIPTION OF THE INVENTION

Figure 1:
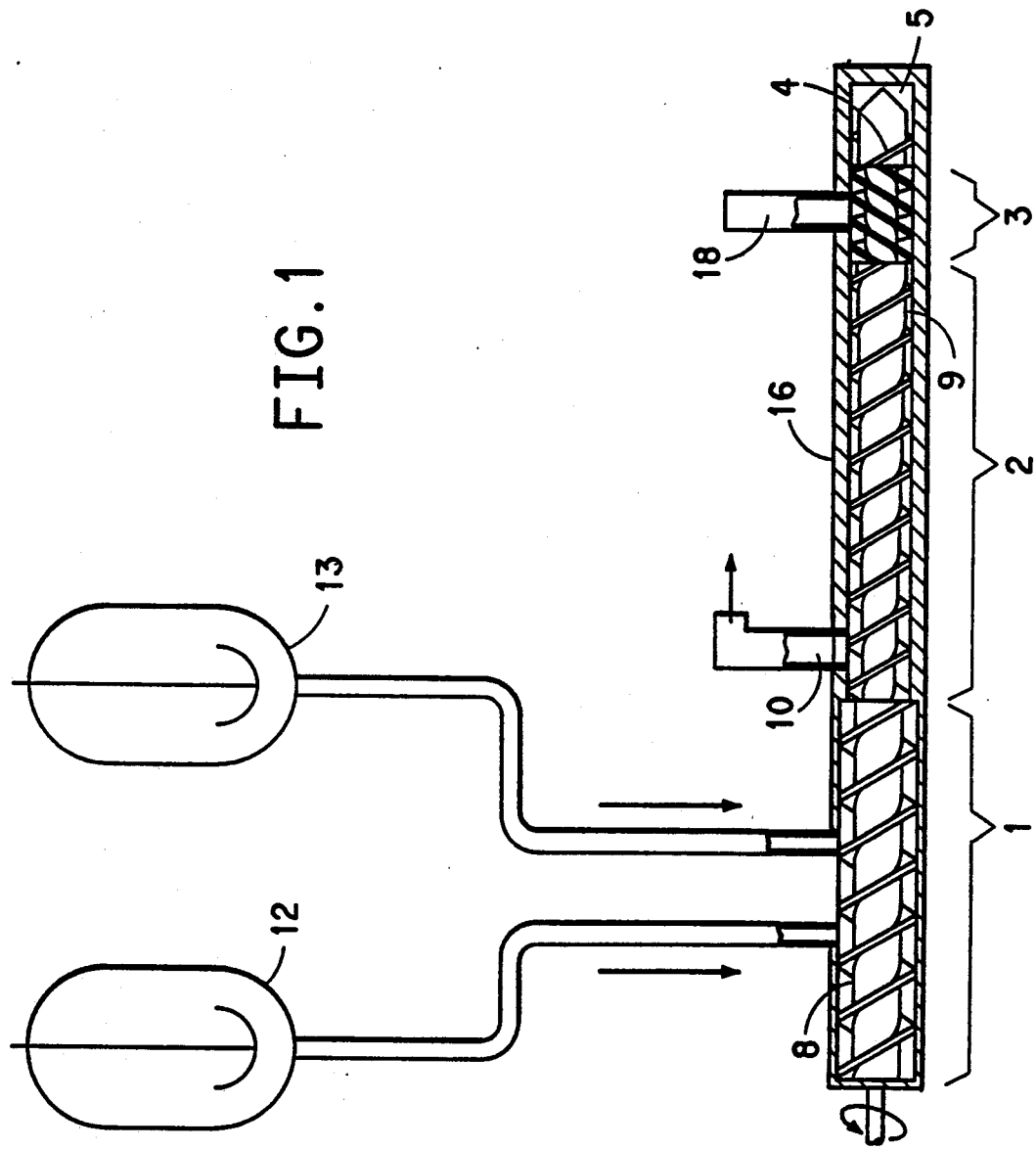
FIG. 1 is a partially diagrammatic, sectional side view of the dewatering extruder used in the process of this invention.

The elastomers used in the process of this invention must be in the form of a latex. Generally, the latex has a solids content of about 25–75%, usually about 35–60%. Conventional emulsifying agents are mixed with water, e.g., chloroprene monomer, and other ingredients to form an emulsion and, subsequent to polymerization, a latex. The latex particles consist of aggregates of the elastomer protected by the emulsifying agent, e.g., rosin soaps, which are absorbed on the surface of the particles. Representative elastomer latices that can be used in the process of this invention include polychloroprene, styrene-butadiene, polybutadiene, nitrile rubber and polyisoprene. Polychloroprene is especially preferred.

The chloroprene polymer is a sulfur-modified, an alkyl mercaptan-modified, or a dialkyl- or dialkoxy xanthogen disulfide-modified polychloroprene homopolymer or copolymer of chloroprene and 2,3-dichlorobutadiene-1,3, or a monoethylenically unsaturated monomer containing from 3 to 10 carbon atoms or mixtures thereof. The ethylenically unsaturated monomer may be further described as a vinyl monomer having a boiling point of from 0° to 200° C. The preferred vinyl monomers are acrylonitrile, methacrylonitrile, lower alkyl acrylates, methacrylates, acrylamides, methacrylamides, maleates and fumarates, acrylic acid, methacrylic acid, fumaric acid, and maleic acid. The vinyl monomers are generally less reactive than 2-chloro-1,3-butadiene in contrast to 2,3-dichloro-1,3-butadiene which is more reactive.

The alkyl mercaptan modifiers used in the preparation of polychloroprene generally have chain lengths of about from 4–20 carbon atoms. The alkyl radicals may be straight-chained or branched, and they may be primary, secondary, or tertiary. The dialkyl xanthogen disulfide modifiers can be represented by the structure

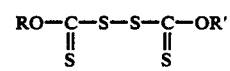

wherein R and R' are alkyl radicals having 1–8 carbon atoms. Examples of suitable alkyl radicals are methyl, ethyl, propyl, isopropyl, and the various isomeric butyl, amyl, hexyl, heptyl, and octyl radicals. The preferred dialkyl xanthogen disulfides are those in which each alkyl radical has 1-4 carbon atoms, especially diisopropyl xanthogen disulfide. The dialkoxy xanthogen disulfide modifiers are compositions of the formula

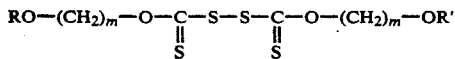

$$RO-(CH_2)_m-O-\underset{\underset{S}{\|}}{C}-S-S-\underset{\underset{S}{\|}}{C}-O-(CH_2)_m-OR'$$

wherein R and R' are alkyl radicals having 1-8 carbon atoms and m is 2 to 6. Examples of suitable alkyl radicals are methyl, ethyl, butyl and hexyl with ethyl being preferred. The modifier may also be elemental sulfur. Generally, the modifier content of the polymer is from 0.05 to 0.15 weight percent in order to maintain the gel content of the product within the desired range. The chloroprene polymer is prepared by emulsion polymerization at 10° C. to 50° C. Generally, the polymerization is stopped at 40% or higher chloroprene monomer conversion.

Styrene/butadiene elastomer latices are well known in the art and also can be used in the process of this invention. These elastomer latices are prepared by polymerizing an emulsion of generally, from 60 to 75 parts by weight butadiene, from 25 to 40 parts by weight styrene, from 1 to 5 parts by weight emulsifying agent, from 0.1 to 1.0 parts by weight polymerization catalyst, from 0.1 to 1.0 parts by weight modifying agent and 100 to 300 parts by weight water, at 40° C. to 60° C.

The polybutadiene elastomers suitable for use herein can be produced by a variety of processes. One such suitable process is free-radical polymerization in emulsion initiated by an active free-radical R formed by the decomposition of a peroxide, persulfate or similar free radical forming reaction.

Poly-1,4-isoprene elastomers suitable for use herein include the natural rubbers (both Hevea and Balata) and synthetic polyisoprene. The synthetic polyisoprenes can be emulsion polymerized in an aqueous system using free-radical initiation. Suitable free-radical initiators are potassium persulfate or a redox system using cumene hydroperoxide-iron pyrophosphate. The molecular weight is controlled by addition of a mercaptan such as dodecyl mercaptan.

The organic fibrous filler incorporated in the elastomer can be a natural or synthetic fiber such as cotton, cellulose acetate, polyamides, polyaramids, and polyesters. Preferred fibers are cotton and the polyaramid poly(paraphenylene terephthalamide) e.g., Kevlar® aramid pulp. The length of the uncompounded fibrous fillers used in the present process that is fed to the extruder is less than about 25 mm. Usually, fibrous fillers of from about 0.02-6 mm in length, preferably, 0.3-3 mm are used in the process of the invention. Smaller lengths are also satisfactory but generally the fibers are not less than about 0.3 mm in length due to the cost of further size reduction without increase in benefit. Fibers larger than lengths of about 25 mm are difficult to process due to entanglement. The diameter of the organic fibrous filler is usually narrower than its length. In general, diameters can vary widely but are usually from 8-50 microns. Cotton fibers have, typically, diameters about 12-18 microns and Kevlar® aramid pulp about 12-17 microns. Generally, the length to diameter ratio can be expressed as follows: L:D≧10, the longer length fillers providing better reinforcement of the fabricated article.

The amount of organic fibrous filler added to the elastomer latices, substantially all of which is incorporated in the polymer, varies depending on the particular use to be made of the elastomers. Generally, amounts between about 1-100 parts filler per 100 parts elastomer are added, and usually the organic fibrous filler is fed to the elastomer latex in amounts of from about 5-30 parts filler per 100 parts elastomer especially for articles to be used without further dilution in dynamic applications, e.g., power transmission belts and tires.

The elastomer latex can be preblended with an aqueous slurry of fibrous filler. The aqueous fiber slurry can be prepared using either conventional low shear mixers such as propeller or turbine devices or high shear mixers. Thickeners can be added to the slurry to increase dispersive shear stress for a given mixing device, to help prevent subsequent settling, and as an aid to ultimate latex/slurry coagulation. Other compatible additives, such as processing oils, carbon black and dyes may be added to the slurry or latex to be incorporated into the coagulated elastomer. It is preferable to use low shear conventional mixing techniques when blending the latex with the aqueous slurry to prevent premature partial coagulation. Thus one or more elastomer latices such as a polychloroprene latex or a styrene/butadiene latex can be preblended with the aqueous slurry of organic fibrous filler and the resultant blend fed to the coagulation dewatering extruder. Alternatively, the elastomer latex and the aqueous slurry of fibrous fillers can be added as separate streams to the extruder. As can be seen a variety of combinations are envisioned by the present invention.

The elastomer latices are coagulated in the extruder. Suitable coagulants used in the present process include aqueous solutions of salts such as calcium chloride, aluminum sulfate, sodium chloride, sodium sulfate, or sodium acetate. Cationic soaps such as polyoxypropylene methyl diethyl ammonium chloride (EMCOL CC-9) and aqueous polyamine solutions can also be used, either alone or in conjunction with salts, to neutralize the anionic surfactants used to stabilize latices. Alternatively, mechanical coagulation of the elastomer can be conducted by introducing a second high pressure section between the elastomer latex/aqueous slurry injection point and the waste liquid removal point, the latex being coagulated by high shear in this region. Cylindrical barrel-filling screw bushings can be used for this purpose to subject all passing elastomer to high sustained shear. Chemical coagulation is preferred.

For polychloroprene, typically prepared from a monomer emulsion stabilized with resin or rosin soap at a pH of 10 or higher, mineral acids and carboxylic acids may be used to reduce the pH to neutralize the resin or rosin soaps and initiate or accelerate coagulation. The preferred acid is acetic acid which may be added as a separate stream or in admixture with the coagulant.

The coagulant (and acid, as appropriate) can be added upstream or downstream from the point the latex/slurry blend is added to the extruder. However, if the slurry and latex are added as separate streams, it is preferred to add the coagulant (and acid) downstream of the point at which the slurry is added to prevent premature coagulation of the elastomer prior to introduction of the fibers in the process and subsequent loss of fiber in the waste liquid. Alternatively, the coagulant may be mixed directly into the fiber slurry for separate injection into the extruder either upstream or downstream of the latex injection point whereby the coagulating agent is thus added coincident with mixing of the fiber slurry and latex.

Water-dispersable thickeners can be used in this process. They may be added with the latex, the coagulant, as a separate stream or incorporated into the fiber slurry. Incorporation into the fiber slurry is preferred, as the thickeners also prevent settling of the fibers or through-drainage of the water and can improve fiber dispersion by increasing the effectiveness of the mixing steps. The thickener increases the efficiency of coagulation and minimizes the amount of dispersed polymer in the effluent water. Preferred thickeners are Alcogum 6625 sodium polyacrylate and Alcogum SL-76 acrylic emulsion terpolymer, available from Alco Chemical Company and used in concentrations of, for example, 1 to 10 parts per hundred parts cotton fibers or, for example, 7 to 50 parts per hundred parts Kevlar® pulp to stabilize typical 5% cotton fiber and 1% Kevlar® aramid pulp slurries. Other suitable thickeners include, for example, hydroxyethylcellulose, various starches, gums and peptides known to those skilled in the art. The preferred coagulant is an aqueous solution of calcium chloride. The concentration of such a solution can be as low as 2% or as high as 50%. The particular coagulant concentration depends to a large extent on its flow rate being substantially similar to that of the latex.

The coagulated elastomer latex/slurry mixture is fed to a dewatering zone where it contacts a flow restriction in the form of a pressure seal. The particular pressure applied to the coagulated elastomer depends on the flow rate, restriction design, screw speed and compound viscosity. Substantial amounts of water are separated from the coagulated elastomer as it passes through the flow restriction that applies back pressure so that water is removed in the dewatering zone through a vent upstream from the flow restriction.

The fiber-filled elastomer can be discharged from the extruder and subsequently dried to remove excess liquid. Alternatively, the extruder is provided with a subatmospheric pressure zone 5 downstream from the flow restriction for removal of remaining water from the coagulated elastomer by vacuum. The coagulated elastomer exiting the flow restriction is fed to a subatmospheric pressure zone to remove water from the elastomer to substantially dry the elastomer before it is discharged.

Figure 2:
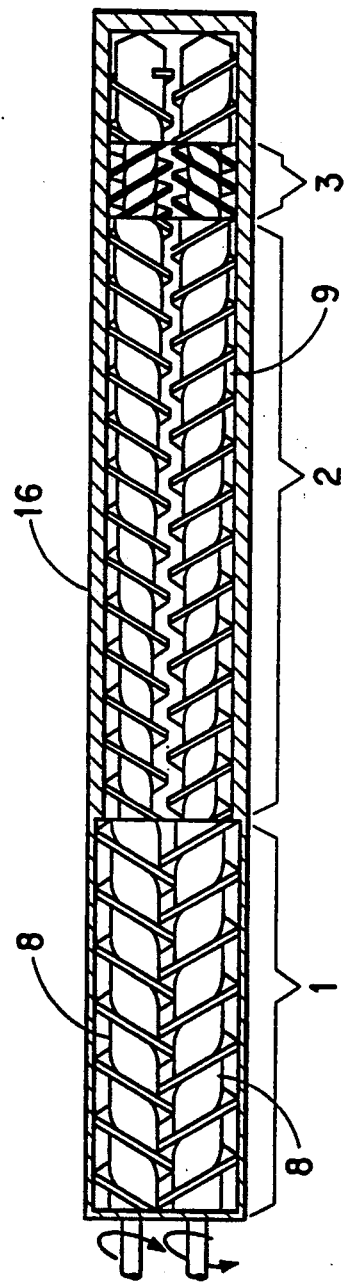
FIG. 2 is a simplified, sectional top view of the dewatering extruder screws, showing the arrangement of their flights.

Referring to FIG. 1, 12 is a feed tank containing, e.g., a mixture of chloroprene polymer latex and an aqueous slurry of organic fibrous filler; 13 is a feed tank containing a coagulating agent such as aqueous calcium chloride; 16 is a twin-screw extruder housing containing screws 8, as shown in FIG. 2. The extruder is divided into the following three zones; 1 the polymer coagulation zone; 2, the liquid separation zone; and 3, the pressure seal zone. As can be seen in FIG. 1, toward the downstream end of zone 2 the screw channels 9 can be made more shallow to provide a pumping action toward the pressure seal 4 that functions as a flow restriction. The pressure rises high enough to force the low viscosity fluid (water) to move counter to the screw movement. Waste liquid is removed through vent 10. To prevent loss of polymer with the waste liquid, a mechanical dewatering device can be installed at that point. This can be, for example, a twin-screw mechanism, which returns polymer to the extruder. An automatic valve may be provided in the waste liquid exit line to maintain the desired pressure at the upstream end of zone 2. The pressure seal 4 can be one of several devices known to those skilled in extruder technology for providing a high back pressure. Shown in the figures are reverse pitch screw flight sections which are often used for this purpose. The extruder may also be equipped with barrel valve 18 to relieve pressure developed by the pressure seal and control extrudate moisture and/or temperature. Downstream from the pressure seal the extruder is fitted with an additional length of conveying screws 11 for polymer removal.

Figure 3:
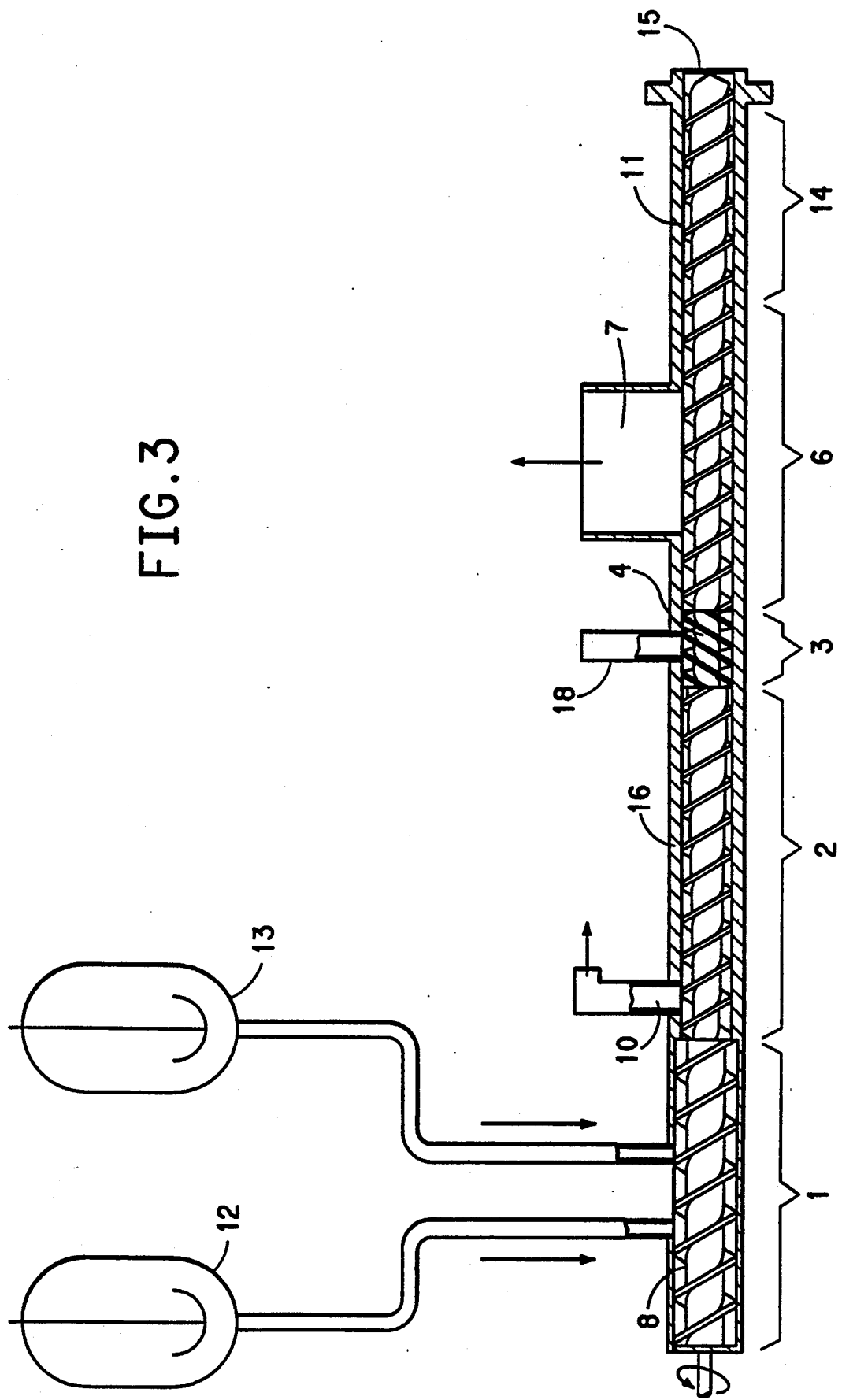
FIG. 3 is a modified embodiment of the dewatering extruder shown in FIG. 1 and FIG. 2 with the addition of a subatmospheric pressure zone and product removal zone.

In zone 1 the screw flights intermesh, while in zone 2 they do not intermesh but are tangential. Counter-rotating or co-rotating intermeshing screws are preferred because of their good venting characteristics and resistance to fouling. Non-intermeshing screws or a single screw extruder are also suitable but could require the use of a high pressure metering pump to force the elastomer latex into the extruder. The elastomer latex/fibrous filler compounded material can be directly expelled or discharged from the extruder assembly shown in FIG. 1 through open die 5 and air dried by conventional means, e.g., in an oven. Alternatively, as shown in FIG. 3, immediately downstream from pressure seal 4, the extruder can be provided with a subatmospheric pressure zone 6 for removal of remaining liquid from the coagulated elastomer by means of a vacuum pump communicating with vacuum port 7. The dried elastomer/fiber mixture, typically containing less than 1% moisture, subsequently passes through product removal zone 14 and is forced through die 15 and cut into final product form for use. One of the twin screws can be truncated and use cylindrical bore barrel sections for the final zone(s). The product removal zone 14 is frequently such a single screw section, superior to a twin screw design in pressure building capability. The drawings are simplified in that they do not show various details obvious to those skilled in the art. For example, the housing is shown without any heat transfer means. Obviously, heating or cooling by means of various fluids circulating through a jacket is possible, as well as use of electric heaters or of heating or cooling coils.

In the operation of one embodiment of the process of this invention, chloroprene polymer latex and aqueous fibrous filler slurry are mixed under low shear conditions in tank 12 and the mixture injected into intermeshing screw section by means of a progressive cavity pump and a hose pump metering device. Coagulant, e.g. calcium chloride, from tank 13 can be injected slightly upstream or downstream of the latex injection point by means of a positive displacement metering pump. The resulting mixture of coagulated elastomer/fibrous filler (coagulum) and water is conveyed forward toward the pressure seal 4, which may be, for example, a section of reverse pitch segments of screws as shown, or a section in which clearances between the screws and the housing are reduced to provide a restriction and, therefore, high pressure at the seal. The particular peak pressure depends on the flow rate, restriction design, screw speed and compound viscosity. Water or other liquid separated from the elastomer during the coagulation process is forced back from the pressure seal zone and removed through vent 10 in zone 2. Coagulum passing through the pressure seal contains from about 2-35 weight percent water with the absorptive fibers, such as cotton. The coagulum can be discharged or expelled from the open bores of the extruder and air dried in conventional equipment such as conveyor driers to obtain a product having less than 1% moisture. Alternatively, as shown in FIG. 3 residual water held by the coagulum which passes through the pressure seal can be substantially removed in subatmospheric pressure zone 6, maintained at a typical pressure of about 200 mm Hg absolute and operated to give a dried product temperature in excess of about 100° C.

The present invention is illustrated below by the following preferred embodiments wherein all parts, proportions, and percentages are by weight unless otherwise indicated.

EXAMPLES

Example 1

Chloroprene was polymerized in an aqueous, alkaline emulsion comprising 100 parts of chloroprene, 3.65 parts of tall oil rosin acid, 0.34 parts sulfur, 0.35 parts sodium resinate rosin soap, and 0.00003 parts copper ion. Polymerization was carried out in a nitrogen-blanketed, agitated, glass-lined kettle at 45° C. by incremental addition of an aqueous solution of 5.00% potassium persulfate and 0.12% 2-anthraquinone sulfonic acid sodium salt. After about 71% of the chloroprene was converted to polymer, the polymerization was stopped by addition of an aqueous emulsion of a toluene solution of 0.05 part of 4,4'-thiobis(3-methyl-6-tertiary butyl phenol) and 1.18 parts of tetraethylthiuram disulfide stabilized with sodium lauryl sulfate and the sodium salt of a condensate of formaldehyde and naphthalene-sulfonic acid. The polymerized emulsion was treated with 2.00 parts of sodium dibutyldithiocarbamate, cooled to 25° C. and allowed to age to effect peptization of the polymer. After 4 hours, the unpolymerized chloroprene was removed by steam distillation at reduced pressure. The resulting latex, containing 40% nonvolatile solids and having a pH of 12, was aged for a total of 22 hours.

Slurry batches of 2.6 kg water, 5 g Alcogum 6625 (sodium polyacrylate) and 6 g Alcogum SL-76 (acrylic emulsion terpolymer), both water dispersible thickeners available from Alco Chemical Company, and 133 g chopped scrap cotton fibers were nominally 0.3 mm in length, were prepared using a high speed mixer with crenellated stator and rotor. The slurry was hand mixed with 3230 g of the polychloroprene latex. The resultant mixture was fed via a tube pump to a dewatering extruder equipped with counter-rotating twin screws with a centerline-to-centerline separation of 20 mm, as shown in FIG. 1 and FIG. 2. A 274 mm length of 24 mm outer diameter intermeshing double-flighted screws was followed by a 356 mm length of 20 mm outer diameter non-intermeshing screws including opposed restrictive shallow flighted sections 30 mm long terminating 30 mm from the end of each screw. The latex/slurry mixture was introduced into the extruder screw nip at a point 104 mm down the length of the intermeshing screw section. An aqueous coagulant solution consisting of 4% glacial acetic acid and 0.67% Emcol CC-9 polyoxypropylene methyl diethyl ammonium chloride, available from Witco Chemical Company, was injected at a rate of 80 ml/min 23 mm downstream from the slurry-latex mixture using a piston pump. The resultant coagulated fiber-filled polychloroprene was fed through the pressure seal and milky wastewater, containing both uncoagulated latex and uncompounded (loose) fiber at a pH of 6, was removed upstream from the pressure seal due to back pressure generated by the restriction at a rate of 584 ml/min through a 20 mm outer diameter twin screw counter-rotating vent port stuffer centered 328 mm from the start of the intermeshing screws. Damp fiber-filled polychloroprene crumb was extruded from the open barrel discharge at a total rate of 160 g/min or 144 dry g/min. Screw speed was 502 rpm with 1.9 kW peak drive power.

The polychloroprene, which contained a nominal 10 parts by weight cotton fiber per 100 parts elastomer, was air dried and was suitable for use as a masterbatch for fabricating articles such as power transmission belts.

Example 2

Chloroprene was polymerized in an emulsion and the emulsion steam distilled by substantially the same method for preparing polychloroprene latex as described in Example 1. The resulting latex, containing 39% nonvolatile solids and having a pH of 12, was aged for a total of 30 hours.

Slurry batches of 57 kg water, 0.2 kg Alcogum 6625, 0.1 kg Alcogum SL-76, 0.2 kg 3.7% potassium hydroxide in water, and 3.0 kg chopped scrap cotton fibers were nominally 0.3 mm long were prepared using a high speed mixer with crenellated stator and rotor. The slurry was hand mixed with 76.5 kg of the polychloroprene latex. The resultant mixture was fed via a progressive cavity pump to a dewatering extruder equipped with counter-rotating twin screws with a centerline-to-centerline separation of 51 mm as shown in FIG. 1 and FIG. 2. A 610 mm length of 60 mm outer diameter intermeshing double-flighted screws was followed by a 902 mm length of 51 mm outer diameter non-intermeshing screws including opposed restrictive reverse flighted sections 44 mm long terminating 162 mm from the end of each screw.

The latex/slurry mixture was introduced into the extruder screw nip at a point 114 mm down the length of the intermeshing screw section at 713 kg/hr. An aqueous coagulant solution consisting of 4% glacial acetic acid and 0.67% Emcol CC-9 polyoxypropylene methyl diethyl ammonium chloride was injected at a rate of 115 kg/hr 121 mm downstream from the slurry-latex mixture using a piston pump. The resultant coagulated fiber-filled polychloroprene latex was fed through the pressure seal and cloudy wastewater, containing uncompounded fiber and traces of uncoagulated latex at pH 5, was removed upstream from the pressure seal due to back pressure generated by the pressure seal through a 58 mm outer diameter twin screw counter-rotating vent port stuffer centered 762 mm from the start of the intermeshing screws. The pressure measured immediately upstream of the pressure seal varied from about 50–420 psi (0.3–2.9 MPa). The polychloroprene containing 10% water was extruded as expanded crumb from the open barrel discharge. Screw speed was 500 rpm with 29 kW peak drive power. The crumb was continuously dried with 142° C. air in a vibratory conveyer with 2 minute residence time. The dried polychloroprene containing less than 1% moisture was produced at a rate of about 237 kg/hr. and contained a nominal 10 parts by weight fiber filler per 100 parts by weight polychloroprene.

A sample of the fiber-filled polychloroprene was passed through a rubber mill ten times and exhibited acceptable dispersion of the fibers for use in making power transmission belts.

Example 3

Chloroprene was polymerized in an emulsion by substantially the same procedure as described in Example 1, except that the sodium salt of a condensate of formaldehyde and naphthalene-sulfonic acid was used in place of sodium resinate rosin to stabilize the aqueous chloroprene/ sulfur dispersion. After polymerization to about 71% conversion, unpolymerized chloroprene was removed by steam distillation. The resulting polychloroprene latex, containing 42% nonvolatile solids and having a pH of 12, was aged for a total of 27 hours.

A slurry of 301 kg water and 15.9 kg chopped scrap cotton fibers were nominally 0.3 mm long and containing about 5–15% moisture was prepared using a conventional tank agitator and this slurry mixed with of the polychloroprene latex in a second tank using another conventional agitator. The resultant mixture was fed to the screw extruder described in FIG. 3. The extruder was 610 mm long and had 60 mm outer diameter intermeshing double-flighted screws, 787 mm of 51 mm outer diameter non-intermeshing screws, opposed restrictive cylindrical bore-filling sections 38 mm long, opposed restrictive reverse flighted sections 44 mm long, and additional 51 mm outer diameter non-intermeshing screws, one 648 mm long and the other 946 mm long extending through a cylindrical bore some 305 mm in length. A barrel valve located adjacent to the 38 mm long opposed restrictive cylindrical sections was opened to greatly reduce the pressure drop across this section.

The latex/slurry mixture was introduced into the extruder screw nip at a point 114 mm down the length of the intermeshing screw section at a rate of 869 kg/hr. An aqueous coagulant solution consisting of 23% calcium chloride brine was injected at a rate of 121 kg/hr together with an aqueous solution of 3% acetic acid at a rate of 82 kg/hr into the extruder 121 mm downstream from the slurry-latex mixture using piston pumps. The resultant coagulated fiber-filled polychloroprene was fed through the pressure seal and wastewater, containing some 0.3% uncompounded fiber (typical of previous samples) but no uncoagulated latex at pH 5, was removed upstream from the pressure seal through a 58 mm outer diameter twin screw counter-rotating vent port stuffer centered 762 mm from the start of the intermeshing screws due to back pressure generated by the restriction. The pressure generated and measured immediately upstream of the pressure seal was about 1420–1440 psi (9.8–0.9 MPa). A vacuum of 200 mm Hg absolute pressure was applied to a 203 mm long vent stack starting 1575 mm down the screw. The coagulated polychloroprene fed through the pressure seal was extruded at a rate of 190 kg/hr through a 51 mm by 13 mm slit die to produce a 128° C. rope containing 0.6% moisture, based on weight loss after 6 minutes milling. Screw speed was 350 rpm with 35 kW peak drive power. The fiber-filled polychloroprene contained 8.3 parts by weight cotton fiber filler per 100 parts by weight elastomer as measured by dissolving the compound in toluene, filtering and drying the filler. The product was suitable for use as a masterbatch for fabricating articles such as power transmission belts.

Example 4

Chloroprene was polymerized in an emulsion and the emulsion steam distilled by substantially the same method described in Example 1, except that the sodium salt of a condensate of formaldehyde and naphthalene-sulfonic acid was used in place of sodium resinate rosin to stabilize the 4-4'-thiobis(3-ethyl-6-tertiary butyl phenol) and, also, tetraethylthiuram disulfide emulsion was used to stop polymerization. The resulting polychloroprene latex, containing 39% nonvolatile solids and having a pH of 12, was aged for a total of 30 hours.

A slurry consisting of 14.0 kg water, 100 g Alcogum 6625, 15 g Alcogum SL-76 and 221 g Kevlar ® aramid pulp was prepared using a 1 horsepower mixer with crenellated stator and rotor. The slurry was hand mixed with 3230 g of the polychloroprene latex. The latex/slurry mix and 61 ml/min of an aqueous coagulant solution consisting of 4% acetic acid and 5% calcium chloride were fed to the dewatering extruder as described in Example 1. The resultant coagulated fiber-filled polychloroprene was fed through the pressure seal and wastewater, substantially free of polychloroprene and fiber at pH 4 was forced out of a vent upstream from the pressure seal, due to back pressure generated by the restriction, at a rate of 780 ml/min. Water and damp polychloroprene crumb were extruded from the open barrel discharge at a total rate of 164 g/min or 70 dry g/min. Screw speed was 248 rpm with 1.4 kW peak drive power.

The fiber-filled polychloroprene containing a nominal 15 parts by weight fibrous filler per 100 parts polychloroprene was air dried. 10-pass milled sheet typically exhibited no more than 1 undispersed clump of fiber per square cm. The polychloroprene can be used to fabricate power transmission belts.

Example 5

Chloroprene was polymerized in an emulsion and the emulsion steam distilled by substantially the same procedure described in Example 3. The resulting polychloroprene latex, containing 43% nonvolatile solids, was aged for a total of 28 hours.

A slurry of 399 kg water, 3 kg of Alcogum 6625, 0.4 kg of Alcogum SL-76, and 6.0 kg of Kevlar ® aramid pulp (available from E. I. du Pont de Nemours and Company) about 0.3 mm long was prepared using a conventional tank agitator and pumped through a high shear mixer consisting of three crenallated stator/rotor pairs in series into a second tank where the slurry was mixed with 91 kg of the polychloroprene latex using another conventional agitator. The resultant mixture was fed to the dewatering screw extruder described in Example 3. The latex/slurry mixture was introduced 114 mm down the length of the screw extruder and aqueous coagulant consisting of 3% acetic acid and 5% calcium chloride was injected at a rate of 30 kg/hr 121 mm downstream from the slurry-latex mixture. The resultant coagulated fiber-filled polychloroprene latex was fed through the pressure seal. Wastewater, free of polymer and uncompounded fiber, was forced out of a vent upstream from the pressure seal due to back pressure generated by the pressure seal. The pressure generated and measured immediately upstream of the pressure seal was 80 psi (0.55 MPa). A vacuum was applied to a 203 mm long vent stack starting 1587 mm down the screw. The compound was extruded at 90 kg/hr through the slit die of the apparatus described in Example 3 to produce a 140° C. rope containing 0.2% moisture. Screw speed was 250 rpm with 17 kW peak drive power.

10-pass milled sheet exhibited no undispersed clumps of fiber and contained 20 parts by weight Kevlar ® aramid pulp per 100 parts elastomer per the test described in Example 3.

Example 6

A slurry of 558 kg water, 3 kg of Alcogum 6625, 0.4 kg of Alcogum SL-76, and 5.7 kg of Kevlar ® aramid pulp was prepared using a conventional tank agitator and pumped with a hose pump at 957 kg/hr directly into the dewatering screw extruder described in Example 3. The aqueous slurry was fed to the extruder at a point 114 mm from the start of the screw into the extruder screw nip from below the screw. A polychloroprene latex that was a homopolymer and dodecyl mercaptan-modified comprising 45% solids, was fed with a progressive cavity pump into the extruder at a point 114 mm from the start of the extruder screw from above the screw. An aqueous coagulant solution consisting of 23% calcium chloride brine was injected at a rate of 24 kg/hr together with an aqueous solution of 3% acetic acid at a rate of 58 kg/hr into the extruder 381 mm from the start of the screw. The resultant coagulated fiber-filled polychloroprene was fed through the pressure seal and wastewater, slightly cloudy with residual emulsion contained no uncompounded fiber. The wastewater was forced out of a vent due to back pressure generated by the restriction. The barrel valve was fully opened, as described in Example 3. A vacuum was applied to the vent stack and the fiber-filled polychloroprene was extruded at 92 kg/hr through the slit die to produce 145° C. rope containing 0.1% moisture. The polychloroprene contained a nominal 15 parts by weight fibrous filler per 100 parts by weight polymer. Screw speed was 250 rpm with 20 kW peak drive power.

10-pass milled sheet exhibited no undispersed clumps of fiber and the fiber-filled polychloroprene was suitable for use in making power transmission belts.

Example 7

Slurries of water, Alcogum 6625, Alcogum SL-76 and Kevlar ® aramid pulp were prepared and hand mixed with commercial styrene butadiene (SBR), polybutadiene and natural rubber latices as shown in the following Table. The SBR latex is available from BASF as Butanol NS 120-121 PL240 Anionic SBR Latex; the polybutadiene homopolymer latex from Synpol; the natural rubber latex from Vultex. The Kevlar ® aramid pulp was substantially the same as that used in Example 5. The latex/slurry mixtures and aqueous coagulant solutions were fed to the dewatering screw extruder described in Example 1 following the procedure described in Example 1. The coagulated fiber-filled elastomers were fed through the pressure seal and wastewater, substantially free of polymer and fiber, was forced out of a vent upstream from the restriction due to back pressure generated by the restriction. Water and damp fiber-filled polymer crumb was extruded from the open barrel discharge. The polymer was air dried as described in Example 1. Screw speed, peak drive power and dry production rate are shown in Table I.

The fiber-filled elastomer contained 15 parts by weight filler per 100 parts elastomer. The elastomers were air dried. 10-pass milled polymer sheet exhibited acceptable fiber dispersion for use in the manufacture of power transmission belts.

TABLE I

| Elastomer Type | SBR | Polybutadiene | Polyisoprene |
|---|---|---|---|
| Latex % Solids | 74 | 21 | 62 |
| Parts Rubber | 100 | 100 | 100 |
| Parts CaCl2 Coagulant | 3 | 14 | 11 |
| Parts Acetic Acid | 2 | 0 | 0 |
| Parts Slurry Water | 1200 | 1475 | 1475 |
| Parts Alcogum 6625 | 8 | 8 | 8 |
| Parts Alcogum SL-76 | 1 | 1 | 1 |
| Parts Kevlar ® Aramid Fiber | 15 | 15 | 15 |
| Dry g/min Production Rate | 104 | 44 | 56 |
| Extruder Screw Speed (rpm) | 250 | 50 | 100 |
| Peak Drive Power (kW) | 0.6 | 0.2 | 0.5 |

I claim:

1. A process for incorporating fibrous filler into an elastomer which comprises:
   (a) feeding to a screw extruder an elastomer latex and an aqueous slurry containing about 1-100 parts by weight synthetic fibrous filler having a length less than about 25 mm per 100 parts elastomer, the slurry and latex being fed to the extruder either premixed or as separate streams and subsequently mixed in the extruder,
   (b) adding a coagulating agent subsequent to the mixing of the slurry and the latex,
   (c) coagulating the elastomer latex in the screw extruder to form a coagulated elastomer containing the synthetic fibrous filler,
   (d) feeding the coagulated elastomer containing a synthetic fibrous filler into a dewatering zone,
   (e) feeding the coagulated fiber-filled elastomer through a flow restriction which applied back pressure sufficient that water present in the coagulated elastomer is forced out of a vent provided in the extruder upstream from the flow restriction, and
   (f) discharging and recovering the synthetic fiber-filled elastomer.

2. A process of claim 1 wherein the elastomer latex is a polychloroprene latex.

3. A process of claim 2 wherein the aqueous slurry of fibrous filler and the polychloroprene latex are premixed prior to feeding to the screw extruder.

4. A process of claim 1 wherein the fibrous filler is a polyaramid fiber.

5. A process of claim 4 wherein the polyaramid is poly(paraphenylene terephthalamide).

6. A process of claim 1 wherein the elastomer latex is selected from the group consisting of a styrene-butadiene rubber latex, a polybutadiene latex, and a polyisoprene latex.

7. A process of claim 2 wherein the polychloroprene latex is elemental sulfur-modified polychloroprene.

8. A process of claim 1 wherein the coagulated elastomer exiting the flow restriction is fed to a subatmospheric pressure zone to remove water from the elastomer to substantially dry the elastomer before discharging the elastomer.

9. A process of claim 8 wherein the elastomer latex is a polychloroprene latex.

* * * * *